United States Patent [19]
Sumiya et al.

[11] Patent Number: 4,682,534
[45] Date of Patent: Jul. 28, 1987

[54] HYDRAULIC SERVO FOR FRICTION COUPLING ELEMENT OF AUTOMATIC TRANSMISSION

[75] Inventors: Koji Sumiya, Nishio; Takenori Kano, Anjo; Seitoku Kubo; Kazuaki Watanabe, both of Toyota, all of Japan

[73] Assignees: Aisin-Warner Limited; Toyota Jidosha Kabushiki Kaisha, both of Japan

[21] Appl. No.: 759,826

[22] Filed: Jul. 29, 1985

[30] Foreign Application Priority Data

Jul. 31, 1984 [JP] Japan .................. 59-161897

[51] Int. Cl.$^4$ ............................. F01B 31/00
[52] U.S. Cl. ..................... 92/130 R; 192/85 AA
[58] Field of Search ........... 92/54, 130 R; 74/766, 74/781 R; 192/85 AA, 85 CA, 85 C, 85 A

[56] References Cited

U.S. PATENT DOCUMENTS

| | | | |
|---|---|---|---|
| 2,804,780 | 9/1957 | Gerst | 192/85 AA X |
| 4,114,478 | 9/1978 | Clauss | 74/781 R |
| 4,147,245 | 4/1979 | Folomin et al. | 192/85 AA |
| 4,468,983 | 9/1984 | Vieth | 74/781 R X |

Primary Examiner—Edward K. Look
Attorney, Agent, or Firm—Pahl, Lorusso & Loud

[57] ABSTRACT

Described herein is a hydraulic servo suitable for friction coupling elements in automatic transmissions. The hydraulic servo of the invention is compact in construction and reduced particularly in axial dimensions, and essentially comprises: an annular drum rotatably or fixedly mounted in a transmission case and having a press-formed annular plate member with an first cylinder portion and a second cylinder member joined to the first cylinder portion by fully encircling welding; a piston fitted between the first cylinder portion and the second cylinder member; and a reaction area formed by extending the annular plate member of the drum radially inward to support return springs.

2 Claims, 17 Drawing Figures

FIG. 3
FIG. 4
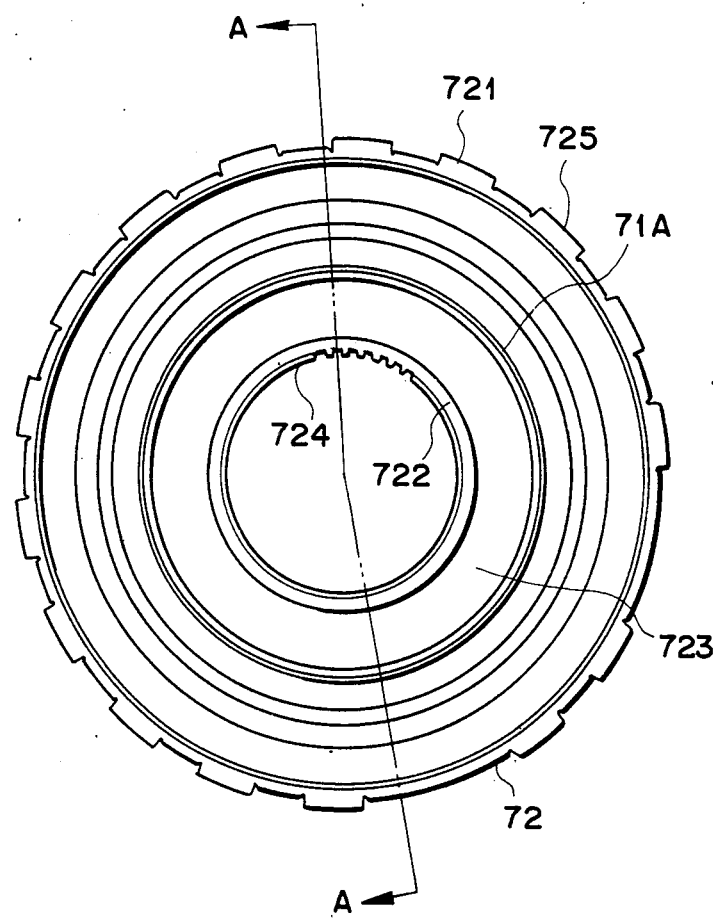
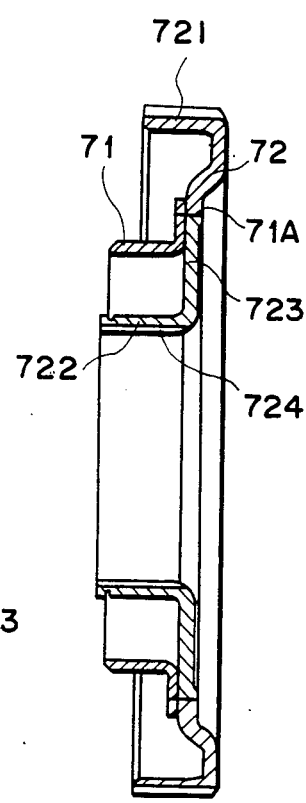

FIG. 5
FIG. 6
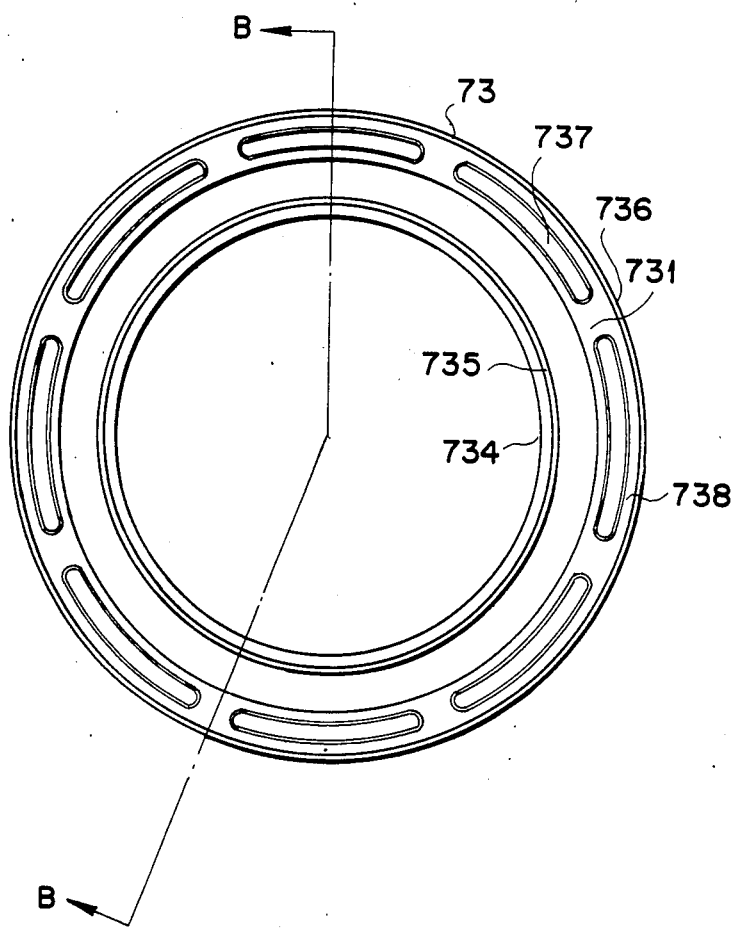
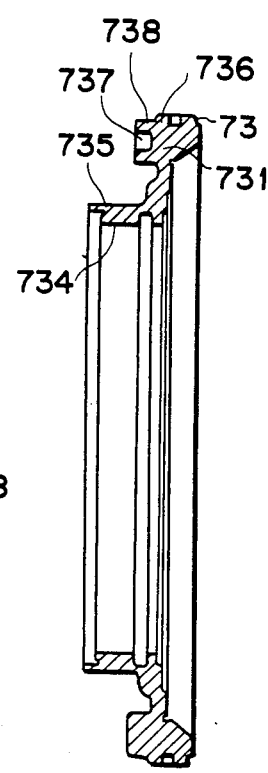

FIG.9
FIG.10
FIG.11
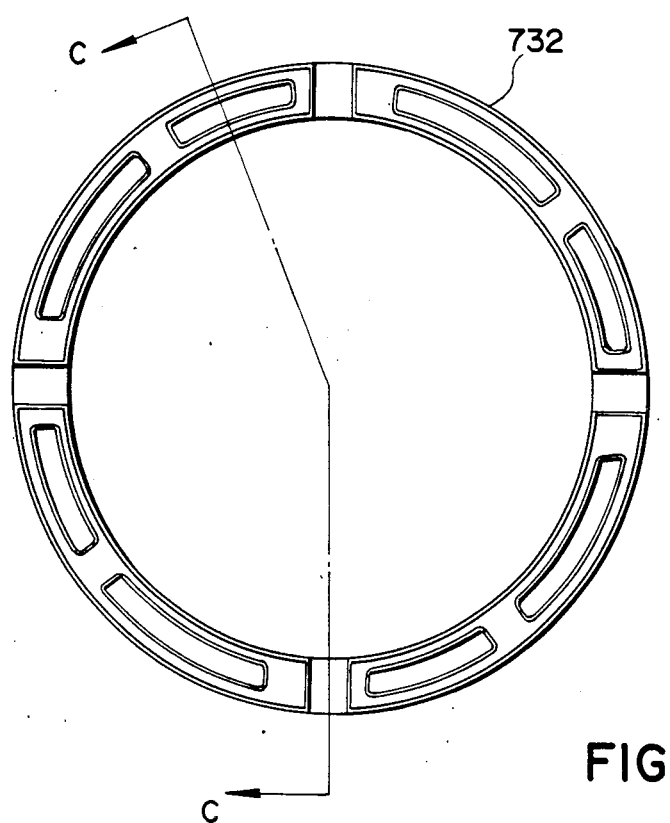
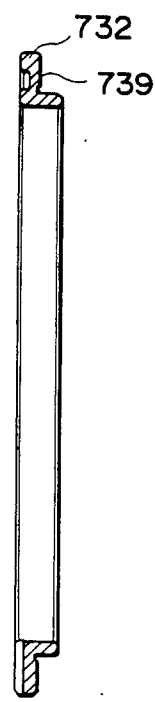
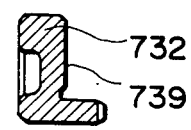

FIG. 12
FIG. 13
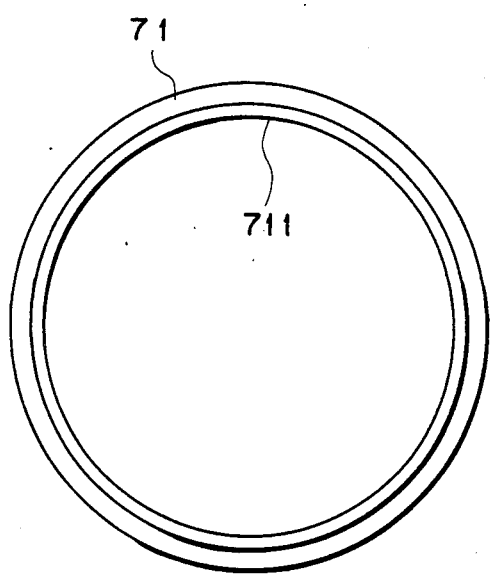
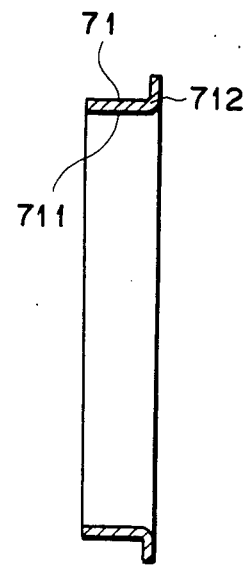

FIG. 14
FIG. 15
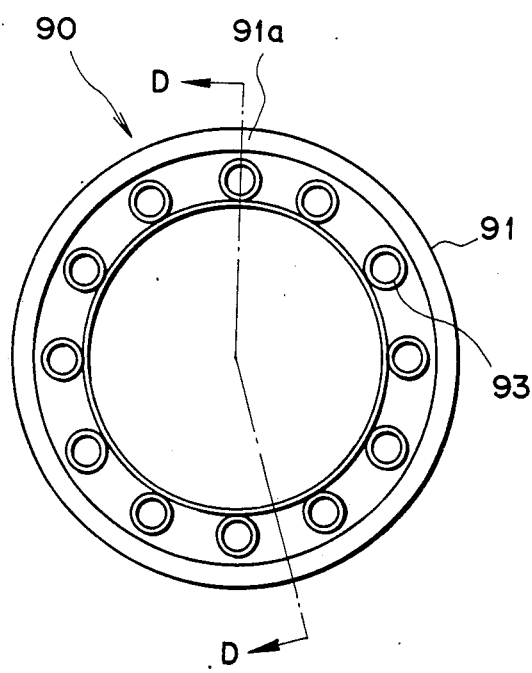
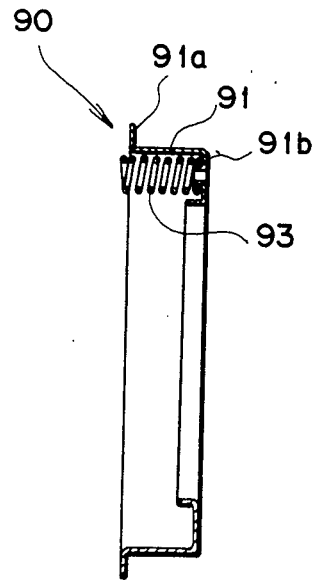

HYDRAULIC SERVO FOR FRICTION COUPLING ELEMENT OF AUTOMATIC TRANSMISSION

BACKGROUND OF THE INVENTION (i) Field of the Invention

This invention relates to a hydraulic servo for friction coupling elements in automatic transmissions.

(ii) Description of the Prior Art

Heretofore, the hydraulic servo for a friction coupling elements in automatic transmission is constituted by an annular drum having a first cylinder which is an outer cylinder, a second cylinder which is an inner cylinder and a side wall connecting the two cylinders and fixedly or rotatably mounted in the transmission case, a piston provided between the first and second cylinders of the drum, and a return spring located outward of the first cylinder or on a wall portion of the piston, coupling and releasing the friction element by supplying and draining line pressure to and from a chamber between the drum and piston.

In a case where the return spring is located outward of the first cylinder, however, the hydraulic servo of the friction coupling element unavoidably has large dimensions in the radial direction. On the other hand, the arrangement in which the return spring is mounted on a wall portion of the piston has a drawback that the hydraulic servo of the friction coupling element becomes lengthy in the axial direction. Further, when upshifting a vehicular automatic transmission from first to second speed, the outer race of a one-way clutch F1 is fixed to the automatic transmission case by engaging a friction brake B2. In this connection, the hydraulic servo B-2 which engages or releases this brake B2 is constituted by an annular hydraulic drum and a piston which is biased by a return spring, usually involving a wide piston mounting space between the first and second cylinders of the hydraulic drum. Therefore, there is little space for mounting the return spring unless the case is extended to a certain extent to secure the return spring mounting space. In addition, shift shocks occur on upshifts from first to second speed due to the use of a large piston.

SUMMARY OF THE INVENTION

It is an object of the present invention to provide a hydraulic servo for friction elements in automatic transmissions, which employs for a friction coupling element a piston of an optimum area to suppress the above-mentioned shift shocks and to save a space for mounting a piston return biasing means, permitting to provide a hydraulic servo of a compact construction for the friction element without extending its mounting space in the radial or axial direction.

According to the present invention, there is provided a hydraulic servo for friction coupling elements in automatic transmissions, which comprises as shown in FIG. 1: an annular drum 70 fixedly or rotatably mounted in a transmission case and having a press-formed annular plate member 72 with a first cylinder portion 721 and a press-formed second cylinder member 71 joined to the annular plate member 72 by full-circle welding; a piston 73 fitted between the first cylinder portion 721 and the second cylinder member 71; and a reaction area 723 extending radially inward from the annular plate member 72 to support return springs 93.

The above-described hydraulic servo for actuating a friction coupling element in an automatic transmission according to the invention has a number of advantages as follows.

(a) The hydraulic servo employs a piston of an optimum area for the friction element to suppress the shift shocks which would otherwise take place on upshifts to second speed, while making a space for mounting return springs for the piston, so that it becomes possible to construct the hydraulic servo in a compact form which will not necessitate extension of its mounting space in the radial or axial direction.

(b) The hydraulic servo construction can be applied to other friction coupling elements to reduce the manufacturing cost.

(c) The use of the press-formed annular drum also contributes to the cost reduction.

(d) The annular plate member and inner cylindrical member which are joined together by fullcircle penetrating electron beam welding prevent leaks of line pressure oil from the hydraulic servo.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIG. 3 is a front view of a hydraulic servo drum of the hydraulic servo according to the invention;

FIG. 4 is a schematic section taken on line A—A of FIG. 3;

FIG. 5 is a front view of a piston employed by the hydraulic servo according to the invention;

FIG. 6 is a schematic section taken on line B—B of FIG. 5;

FIG. 9 is a front view of an adaptor sleeve;

FIG. 10 is a section taken on line C—C of FIG. 9;

FIG. 11 is an enlarged sectional view of the adaptor sleeve;

FIG. 12 is a front view of an inner cylindrical member of the hydraulic servo according to the invention;

FIG. 13 is a sectional view of the inner cylindrical member of FIG. 12;

FIG. 14 is a front view of a connector member and a return spring in the hydraulic servo of the invention;

FIG. 15 is a section taken on line D—D of FIG. 14;

DESCRIPTION OF PREFERRED EMBODIMENTS

Hereafter, the hydraulic servo of the invention which is suitable for use with a friction coupling element of a vehicular transmission is described more particularly by way of the preferred embodiment shown in FIGS. 2 through 17.

Figure 2:
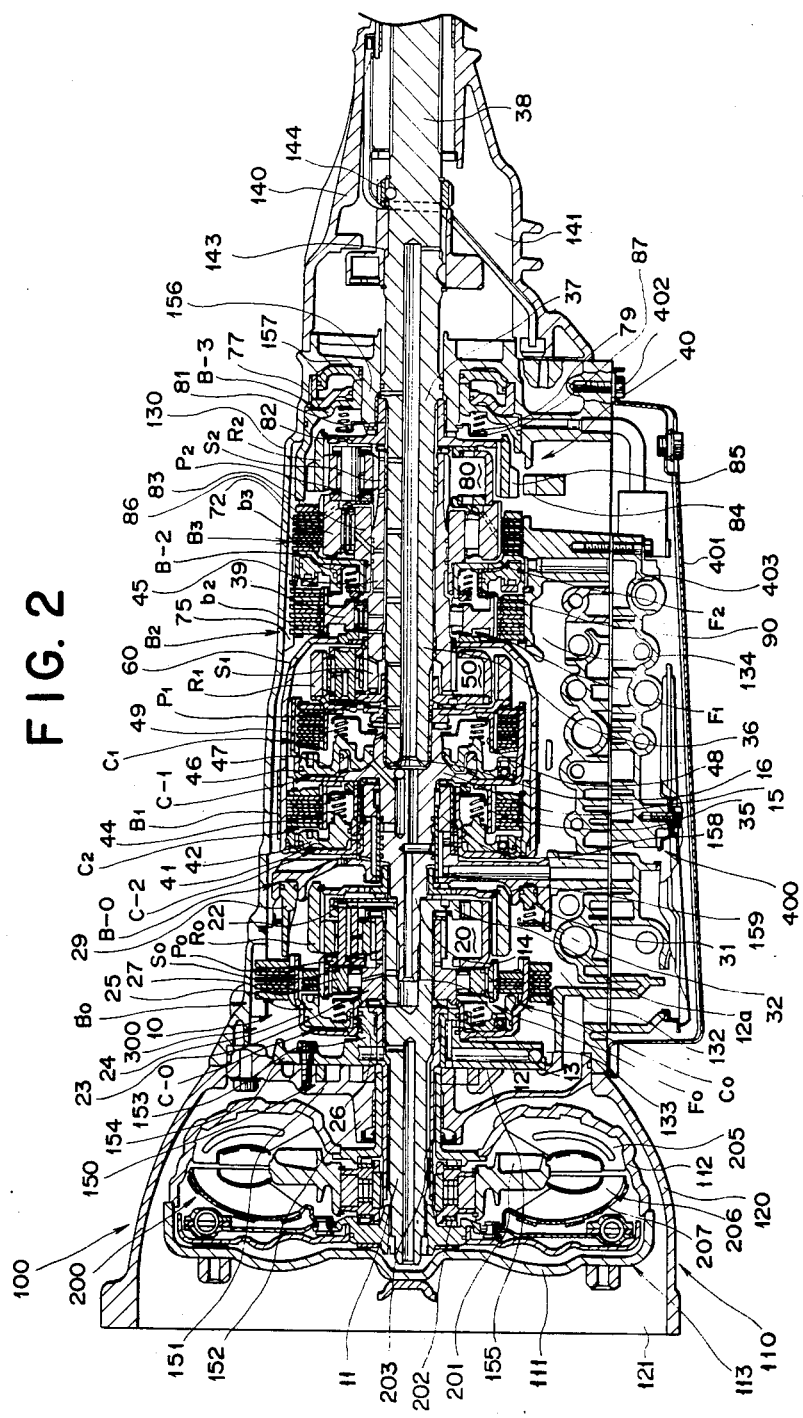
FIG. 2 is a schematic section showing the automatic transmission of FIG. 1 as a whole.
Figure 7:
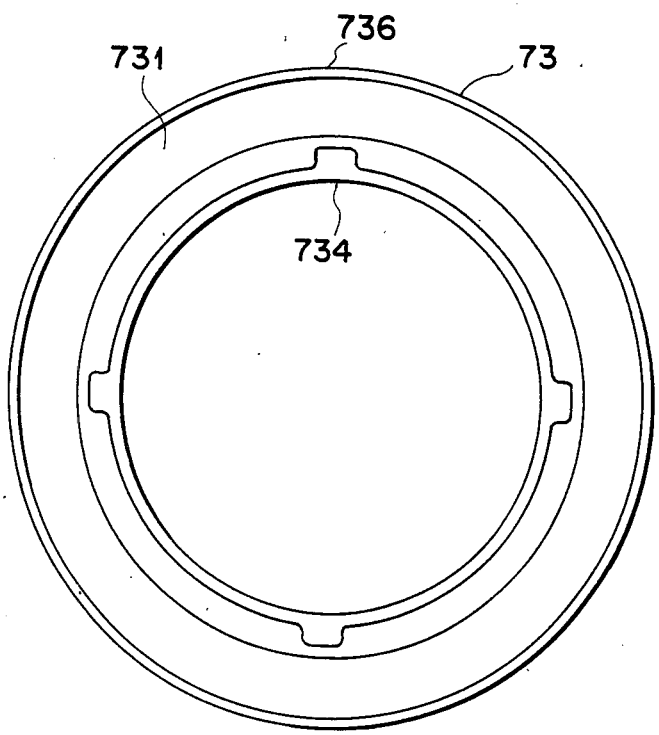
FIG. 7 is another front view of the piston employed by the hydraulic servo of the invention.
Figure 8:
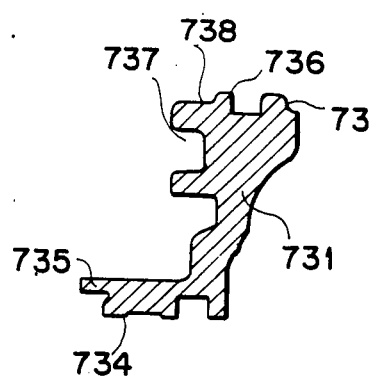
FIG. 8 is an enlarged sectional view of the piston of the hydraulic servo according to the invention.
Figures 16, 17:
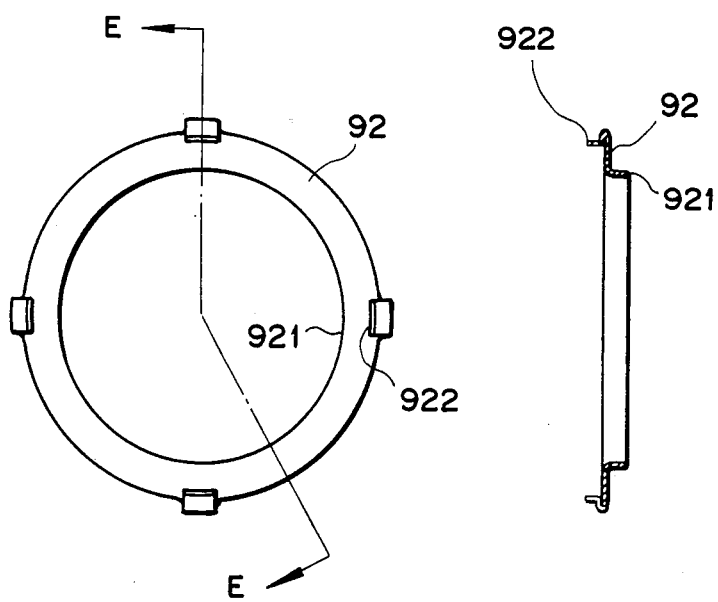
FIG. 16 is a front view of a retainer of the hydraulic servo according to the invention.
FIG. 17 is a section taken on line E—E of FIG. 16.

Referring to FIG. 2, the automatic transmission which is generally designated at 100 includes a fluid coupling 200 (a torque converter in the particular embodiment shown), a transmission 300, and a hydraulic control system 400.

The transmission 300 consists of: an overdrive planetary gear transmission 10 including a first planetary gear set 20, and multiple disk clutch C0, a multiple disk brake B0 and a one-way clutch F0 which are operated by hydraulic servos; and an underdrive planetary gear transmission with three forward speed and one reverse speed ranges, including a second planetary gear set 50, a third planetary gear set 80, and two multiple disk clutches C1 and C2, a belt brake B1, two multiple disk brakes B2 and B3, and two one-way clutches F1 and F2 which are operated by hydraulic servos.

The case 110 of the automatic transmission 100 includes: a torque converter housing 120 accommodating a torque converter 200; a transmission case 130 accommodating in series the overdrive planetary gear transmission and the underdrive planetary gear transmission; and an extension housing 140 covering the rear side of the automatic transmission 100. The torque converter housing 120, transmission case 130 and extension housing 140 are fastened together by a number of bolts.

The torque converter 200 is received in a torque converter compartment 121 within the torque converter housing 120, which is open on the front side (on the side of the engine), and includes: a front cover 111 coupled with the output shaft of the engine; a rear cover 112 in the form of an annular plate welded at its outer periphery to the front cover 111; a pump impeller 205 provided on the inner wall around the inner periphery of the rear cover 112; a turbine runner 206 provided opposingly to the pump impeller 205; a turbine shell 207 retaining the turbine runner 206; a stator 201 supported on a fixed shaft 203 through a one-way clutch 202; and a direct coupling clutch (lock-up clutch ) 113 for directly coupling the front cover 111 with the turbine shell 207. Mounted between the torque converter compartment 121 and a cylindrical transmission compartment 132 of the transmission case 130 is a gear type oil pump 150 and an annular oil pump casing 151 which is centrally provided with a forwardly extending cylindrical portion 152 and fastened to the front end face of the transmission case 130 through a spigot fit. Fastened to the rear side of the oil pump body 151 is an oil pump cover 154 with a rearwardly extending cylindrical front support 153 in coaxial relation with the afore-mentioned cylindrical portion 152. The oil pump casing 151 and oil pump cover 154 form an oil pump housing 155 which serves as a partition wall between the torque converter compartment 121 and the transmission compartment 132 and also as a front support wall for the transmission 300. Provided at a median position in the transmission compartment 132 of the transmission case 130 is an intermediate support wall 159 which is formed separately by casting, the intermediate support wall 159 partitioning the overdrive compartment 133 and the underdrive compartment 134 and being provided with a rearwardly extending cylindrical center support 158.

In a rear portion of the transmission case 130, a rear support wall 157 with a rearwardly extending cylindrical rear support 156 is formed integrally with the transmission case 130. Formed between the oil pump casing (the front support wall or partition wall) 155 and the rear support wall 157 is the transmission compartment 132 which receives the transmission 300, and formed between the rear support wall 157 and the extension housing 140 is a output shaft chamber 141 of the transmission. An electronically controlled sensor rotor 143 and a speedometer drive gear 144 are provided in the extension housing 140, and a sleeve yoke which is not shown is inserted in its rear end portion and coupled with a propeller shaft (not shown) in coaxial relation with the front support 153.

Rotatably supported in the front support 153, on the inner side of the fixed shaft 203, is an input shaft 11 of the transmission, which serves also as the output shaft of the torque converter 200. This input shaft 11 is formed having a larger diameter in its rear end portion 12 which protrudes rearward from the front support 11 and provided with a flange portion 12a, the rear end portion 12 being provided with a center hole 13 along its axis. An intermediate transmission shaft 14 is mounted rotatably in a position rearward of the input shaft 11 in series and coaxially therewith. The intermediate transmission shaft 14 is fitted in the center hole 13 at its fore end which is rotatable in sliding contact with the inner peripheral wall of the center hole 13 through a metal bearing, and formed with a larger diameter in its rear end portion 15 which is provided with a rearwardly opened center hole 16 along the axis thereof. An output shaft 36 is rotatably mounted rearward of and in series with the intermediate transmission shaft 14. This output shaft 36 is fitted in the center hole 16 at its fore end which is in sliding contact with the inner wall of the center hole 16 through a metal bearing. The output shaft 36 is splined in its intermediate portion 37 to a flange plate 82 with a rearwardly projecting shaft portion 81 in meshing engagement with the ring gear R2 of the third planetary gear set 80, and in its rear portion 38 to the afore-mentioned sleeve yoke, fixedly mounting the sensor rotor 143 and speedometer drive gear 144 in the output shaft compartment 141.

The first planetary gear set 20 is mounted rearward of the input shaft 11 in the overdrive compartment 133, having a ring qear R0 coupled with the intermediate transmission shaft 14 through the flange plate 22, a planetary carrier P0 coupled with the flange portion 12a of the input shaft 11 and a sun gear S0 formed on the inner race shaft 23. A rearwardly opened first hydraulic servo drum 24 is fixedly mounted on the inner race shaft 23 on the front side of the first planetary gear set 20, and an annular piston 25 is fitted between the outer peripheral wall of the drum and the inner race shaft 23 to form a hydraulic servo C-0 for the clutch C0, mounting a return spring 26 on the side of the inner race shaft 23 and the clutch C0 on the inner side of the outer peripheral wall and coupling with the planetary carrier P0 through the clutch C0. A one-way clutch F0 having the inner race shaft 23 as its inner race is provided on the inner periphery of the first hydraulic servo drum 24 and, between an outer race 27 on its outer periphery and the transmission case 130, the clutch C0 and brake B0 are provided. A piston 29 is fitted in the front side of the center support wall 159 to form a hydraulic servo B-0 for the brake B0, and a return spring 32 is fitted in the inner periphery 31 of a fore end portion 31 of the intermediate support wall 159.

A rearwardly opened second hydraulic servo drum 41 is rotatably fitted on the center support 159 in a front portion of the underdrive room 134, and an annular piston 42 is fitted between its inner and outer peripheral walls to form a hydraulic servo C-2 for the clutch C2, mounting a return spring 44 on the side of the inner peripheral wall and the clutch C2 on the side of the outer peripheral wall. Behind the second hydraulic servo drum 41, a rearwardly opened third hydraulic servo drum 46 with an annular projection 35 on its front side is fixedly mounted on a rear end portion 15 of the intermediate transmission shaft 14. An annular piston 47 is fitted between the just-mentioned rear end portion 15 and the outer peripheral wall to form a hydraulic servo C-1 for the clutch C1, mounting a return spring 49 on the inner peripheral side of the clutch C1 and mounting the clutch C2 on the outer periphery of the annular projection 35. The second and third hydraulic servo drums 41 and 46 are coupled through the clutch C2. Provided behind the third hydraulic servo drum 46 is the second planetary gear set 50 having its ring gear R1 coupled with the third hydraulic servo drum 46 through the annular projection 48 and clutch C1, a planetary carrier P1 splined on a fore end portion of the output shaft 36, and a sun gear S1 formed integrally with the sun gear shaft 45. A connecting drum 60 which is so shaped as to cover the second and third hydraulic drums 41 and 46 and the second planetary gear set 50 in a minimum space is fixed at its fore end to the outer periphery of the second hydraulic servo drum 41, and connected at its rear end to the sun gear shaft 45 at a position behind the second planetary gear set 50, with a belt brake B1 on the outer periphery thereof.

Brake disks b2 of the brake B2, outer spline 725 of a fourth hydraulic servo drum 72 and brake disks b3 of the brake B3 are fitted from the front side in spline 75 which is formed on the inner side of the transmission case 130 behind the brake B2, and a piston 77 is fitted in an annular hole between the outer periphery of the rear support 156 of the rear support wall 157 and the transmission case 130 to form a hydraulic servo B-3 for the brake B3, supporting the return spring 79 of the hydraulic servo B-3 by a retainer 87 which is mounted at the fore end of the rear support 156.

Provided on the inner side of the brake B2 is a one-way clutch F1 which uses the sun gear shaft 45 as its inner race and has its outer race 39 connected to the brake B2. Mounted behind the one-way clutch F1 is a return biasing means 90 and a one-way clutch F2 having its inner race 83 splined to the fourth hydraulic servo drum 72. The third planetary gear set 80 has a sun gear S2 formed integrally with the sun gear shaft 45, a carrier P2 coupled with the outer race 86 of the forwardly located clutch F2 and with the brake B3, and a ring gear R2 provided with a parking gear 85 around the circumference thereof and coupled with an intermediate portion 37 of the output shaft 36. When the shiftlever of the automatic transmission is set in "parking" position, the parking gear 85 is meshed with a parking pawl 84 to fix the output shaft 36.

Figure 1:
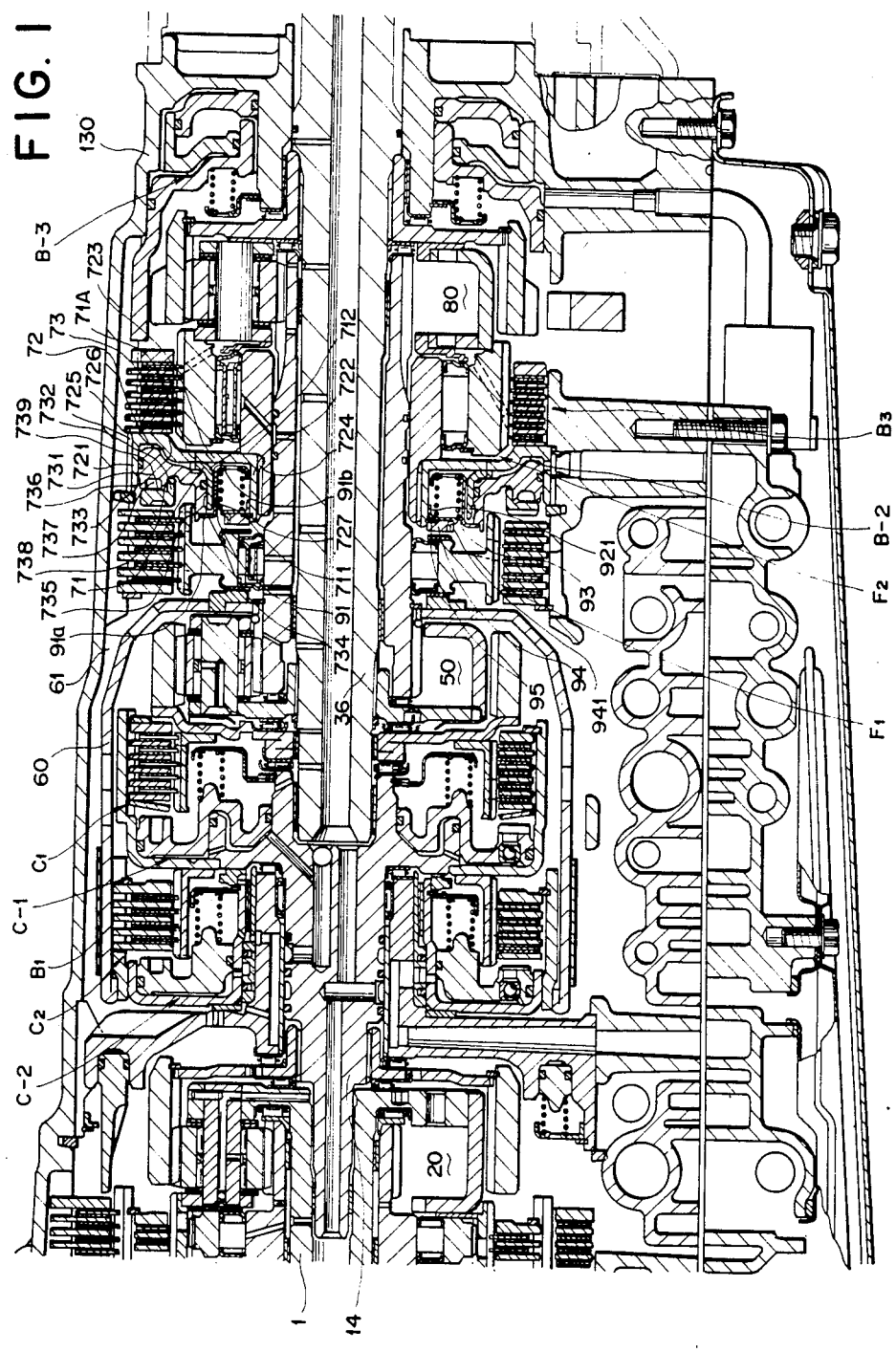
FIG. 1 is a schematic section showing major part of a vehicular automatic transmission incorporating a hydraulic servo according to the invention for a friction coupling element of the transmission.

As shown in FIG. 1, the hydraulic servo 7 according to the invention is mounted in an extra space 61 the connecting drum 60 on the outer side of the second planetary gear set 50, the hydraulic servo 7 including a fourth hydraulic servo drum 72 constituted by: an annular plate member 72 which is open on the front side as shown in FIGS. 3 and 4 and formed into U-shape in section by press-forming, with an outer spline 725 on the outer periphery of a first cylinder 721 for splined engagement with the transmission case 130. The annular plate member 72 is fixed to the transmission case 130 in the rotational direction by the outer spline 725 and fixed in the axial direction by a snap ring 733 and a stepped portion 726 formed on the transmission case 130, receiving the pressure of the brake B3 behind the hydraulic servo; a similarly press-formed second cylinder member 71 which is joined to the annular plate member 72 through a weld 71A which is formed by a full-circle penetrating electron beam welding to ensure higher sealing effect against leaks of oil pressure of the hydraulic servo; and a second inner cylindrical portion 722 projecting forward from a reaction area 723 radially extending inward from the weld joint portion 71A, and having an inner spline 724 on the inner periphery thereof. As shown in FIGS. 5 to 8, a piston 73 is fitted between the first cylinder portion 721 and the second cylinder member 71 projected from a predetermined position of the fourth hydraulic servo drum 70 to form a hydraulic servo B-2 for the brake B2. The piston 73 includes a piston body 731 having a connecting member secured to an end face 735 on the side of its inner periphery as will be described hereinlater and provided with forwardly opened holes 737 in an end portion 738 on the side of its outer periphery 736, and an adaptor sleeve 732 (FIGS. 9 to 11) covering the end portion 738 of the piston body 731 with the rear side 739 of an L-shaped wall. This piston construction facilitates assembling of the snap ring 733 which fixes the fourth hydraulic servo drum 72 to the transmission case 130, and the second cylinder member 71 defines an area of a suitable diameter for the piston 73.

As shown also in FIGS. 14 to 17, the return biasing means 90 includes: a connecting member 91 having one end 91a thereof secured to the end face 735 of the inner periphery 734 of the piston 73 and the other end 91b folded to extend along the inner periphery 711 of the intermediate cylinder 71 and around the other end 712 thereof; a retainer 92 having one end 921 thereof secured to one end 727 of the second cylinder 722 and other other end 922 folded into engagement with the outer periphery of a ring 94 which is fixed in position by a snap ring 95 fixed on one end 727 of the second cylinder 722; and return springs 93 interposed between the connecting member 91 and retainer 92.

The transmission 300 engages or releases the respective clutches and brakes by the oil pressure which is selectively supplied to the hydraulic servoes of the friction coupling elements according to the vehicle speed, throttle opening or other operating conditions of the vehicle by the hydraulic control system 400 in a valve casing 403 in an oil pan 401 which is fastened to the lower side of the transmission case 130, thereby effecting shifts to and from four forward and one reverse speed ranges. Table 1 below shows one example of speed ranges established by engagement and release of the respective clutches, brakes and one-way clutches.

TABLE 1

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
| | 2 | E | E | X | X | X | E | X | (L) | L | f |
| | 3 | E | E | E | X | X | E | X | (L) | f | f |
| | 4 | X | E | E | E | X | E | X | f | f | f |
| S | 1 | E | E | X | X | X | X | X | (L) | f | L |
| | 2 | E | E | X | X | E | E | X | (L) | (L) | f |
| | 3 | E | E | E | X | X | E | X | (L) | f | f |
| L | 1 | E | E | X | X | X | X | E | (L) | f | (L) |

TABLE 1-continued

| | Clutches | | | Brakes | | | | OWC | | |
|---|---|---|---|---|---|---|---|---|---|---|
| RANGES | $C_0$ | $C_1$ | $C_2$ | $B_0$ | $B_1$ | $B_2$ | $B_3$ | $F_0$ | $F_1$ | $F_2$ |
| 2 | E | E | X | X | E | E | X | (L) | (L) | f |

In Table 1, the letter "E" indicates an engaged state of the corresponding clutch or brake, and "L" indicates that the corresponding one-way clutch is engaged only in engine-drive operation and not in engine-brake operation. Further, the letter "(L)" indicates a "locked" state in which the corresponding one-way clutch is engaged in engine-drive operation but its engagement is not necessarily required since the power is delivered by a parallelly mounted clutch or brake. The small letter "f" indicates a free state of the corresponding one-way clutch, and the cross "X" indicates a released state of the corresponding clutch or brake.

What is claimed is:

1. A hydraulic servo for a friction coupling element in an automatic transmission including a casing, said hydraulic servo, comprising:

an annular drum having a first cylinder, a second cylinder, and a side wall connecting said first and second cylinders all integrally formed together as a single piece by press forming, said first cylinder having a plurality of splines on its outer cylindrical surface and being fixed to the interior of the casing through said splines and said second cylinder having a plurality of splines on its inner cylindrical surface;

a press-formed third cylinder joined to the side wall of said annular drum by a fully encircling weld;

a piston fitted between said first cylinder and said third cylinder; and biasing means provided between said third cylinder and said second cylinder for returning said piston.

2. The hydraulic servo of claim 1 further comprising a one-way brake having an inner race splined to said inner cylindrical surface.

* * * * *